US008393422B1

(12) United States Patent
Pensel

(10) Patent No.: US 8,393,422 B1
(45) Date of Patent: Mar. 12, 2013

(54) SERPENTINE ROBOTIC CRAWLER

(75) Inventor: Ralph W. Pensel, Sandy, UT (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 13/481,631

(22) Filed: May 25, 2012

(51) Int. Cl.
*B62D 55/265* (2006.01)
(52) U.S. Cl. ....... 180/9.46; 180/9.44; 180/9.4; 180/901; 280/5.22
(58) Field of Classification Search .................. 180/9.46, 180/9.1, 9.5, 9.52, 9.44, 9.4, 901; 280/5.2, 280/5.22; 104/138.1, 138.2
See application file for complete search history.

(56) References Cited

U.S. PATENT DOCUMENTS

| | | | |
|---|---|---|---|
| 107,874 A | 8/1914 | Appleby |
| 1,112,460 A | 10/1914 | Leavitt |
| 1,515,756 A | 11/1924 | Roy |
| 1,975,726 A | 10/1934 | Martinage |
| 2,025,999 A | 12/1935 | Myers |
| 2,082,920 A | 6/1937 | Aulmont |
| 2,129,557 A | 9/1938 | Beach |
| 2,312,072 A | 3/1940 | Broadwater |
| 2,311,475 A | 2/1943 | Schmeiser |
| 2,329,582 A | 9/1943 | Bishop |
| 2,345,763 A | 4/1944 | Mayne |
| 2,701,169 A | 2/1955 | Cannon |
| 2,850,147 A | 9/1958 | Hill |
| 2,933,143 A | 4/1960 | Robinson |
| 2,967,737 A | 1/1961 | Moore |
| 3,037,571 A | 6/1962 | Zelle |
| 3,060,972 A | 10/1962 | Sheldon |
| 3,107,643 A | 10/1963 | Edwards |
| 3,166,138 A | 1/1965 | Dunn, Jr. |
| 3,190,286 A | 6/1965 | Stokes |
| 3,215,219 A | 11/1965 | Forsyth |
| 3,223,462 A | 12/1965 | Dalrymple |
| 3,266,059 A | 8/1966 | Stelle |
| 3,284,964 A | 11/1966 | Saito |
| 3,311,424 A | 3/1967 | Taylor |

(Continued)

FOREIGN PATENT DOCUMENTS

| | | |
|---|---|---|
| CA | 2512299 | 9/2004 |
| CN | 1603068 | 4/2005 |

(Continued)

OTHER PUBLICATIONS

U.S. Appl. No. 12/171,146, filed Jul. 10, 2008; Stephen C. Jacobsen; office action dated Aug. 20, 2012.

(Continued)

*Primary Examiner* — Tashiana Adams
(74) *Attorney, Agent, or Firm* — Thorpe North & Western LLP

(57) ABSTRACT

A serpentine robotic crawler is disclosed. The robotic crawler can include a first frame having a first continuous track rotatably supported by the first frame, a second frame having a second continuous track rotatably supported by the second frame, and a linkage arm coupling the first and second frames together in tandem. The linkage arm can be movable about a first lateral axis associated with the first frame, a second lateral axis associated with the second frame, and at least two longitudinal axes. The longitudinal axes can be oriented by movement of the linkage arm about the first lateral axis and/or the second lateral axis. Movement about the first lateral axis and the second lateral axis can facilitate or provide exposure of leading and trailing ends of each continuous track.

20 Claims, 8 Drawing Sheets

U.S. PATENT DOCUMENTS

| | | |
|---|---|---|
| 3,362,492 A | 1/1968 | Hansen |
| 3,387,896 A | 6/1968 | Sobota |
| 3,489,236 A | 1/1970 | Goodwin |
| 3,497,083 A | 2/1970 | Anderson |
| 3,565,198 A | 2/1971 | Ames |
| 3,572,325 A | 3/1971 | Bazell |
| 3,609,804 A | 10/1971 | Morrison |
| 3,650,343 A | 3/1972 | Helsell |
| 3,700,115 A | 10/1972 | Johnson |
| 3,707,218 A | 12/1972 | Payne |
| 3,712,481 A | 1/1973 | Harwood |
| 3,715,146 A | 2/1973 | Robertson |
| 3,757,635 A | 9/1973 | Hickerson |
| 3,808,078 A | 4/1974 | Snellman |
| 3,820,616 A | 6/1974 | Juergens |
| 3,841,424 A | 10/1974 | Purcell |
| 3,864,983 A | 2/1975 | Jacobsen |
| 3,933,214 A | 1/1976 | Guibord |
| 3,934,664 A | 1/1976 | Pohjola |
| 3,974,907 A | 8/1976 | Shaw |
| 4,015,553 A | 4/1977 | Meddleton |
| 4,051,914 A | 10/1977 | Pohjola |
| 4,059,315 A | 11/1977 | Jolliffe |
| 4,068,905 A | 1/1978 | Black et al. |
| 4,107,948 A | 8/1978 | Maolaug |
| 4,109,971 A | 8/1978 | Black |
| 4,132,279 A | 1/1979 | Van der Lende |
| 4,218,101 A | 8/1980 | Thompson |
| 4,260,053 A | 4/1981 | Onodera |
| 4,332,317 A | 6/1982 | Bahre |
| 4,332,424 A | 6/1982 | Thompson |
| 4,339,031 A | 7/1982 | Densmore |
| 4,393,728 A | 7/1983 | Larson |
| 4,396,233 A | 8/1983 | Slaght |
| 4,453,611 A | 6/1984 | Stacy, Jr. |
| 4,483,407 A | 11/1984 | Iwamoto et al. |
| 4,489,826 A | 12/1984 | Dubson |
| 4,494,417 A | 1/1985 | Larson |
| 4,551,061 A | 11/1985 | Olenick |
| 4,589,460 A | 5/1986 | Albee |
| 4,621,965 A | 11/1986 | Wilcock |
| 4,636,137 A | 1/1987 | Lemelson |
| 4,646,906 A | 3/1987 | Wilcox, Jr. |
| 4,661,039 A | 4/1987 | Brenhold |
| 4,671,774 A | 6/1987 | Owsen |
| 4,700,693 A | 10/1987 | Lia |
| 4,706,506 A | 11/1987 | Lestelle |
| 4,712,969 A | 12/1987 | Kimura |
| 4,713,896 A | 12/1987 | Jennens |
| 4,714,125 A | 12/1987 | Stacy, Jr. |
| 4,727,949 A * | 3/1988 | Rea et al. .................. 180/9.32 |
| 4,736,826 A | 4/1988 | White et al. |
| 4,752,105 A | 6/1988 | Barnard |
| 4,756,662 A | 7/1988 | Tanie |
| 4,765,795 A | 8/1988 | Rebman |
| 4,784,042 A | 11/1988 | Paynter |
| 4,796,607 A | 1/1989 | Allred, III |
| 4,806,066 A | 2/1989 | Rhodes |
| 4,815,319 A | 3/1989 | Clement |
| 4,815,911 A | 3/1989 | Bengtsson |
| 4,818,175 A | 4/1989 | Kimura |
| 4,828,339 A | 5/1989 | Thomas |
| 4,848,179 A | 7/1989 | Ubhayakar |
| 4,862,808 A | 9/1989 | Hedgecoxe |
| 4,878,451 A | 11/1989 | Siren |
| 4,900,218 A | 2/1990 | Sutherland |
| 4,909,341 A | 3/1990 | Rippingale |
| 4,924,153 A | 5/1990 | Toru et al. |
| 4,932,491 A | 6/1990 | Collins, Jr. |
| 4,932,831 A | 6/1990 | White et al. |
| 4,936,639 A | 6/1990 | Pohjola |
| 4,997,790 A | 3/1991 | Woo |
| 5,018,591 A | 5/1991 | Price |
| 5,021,798 A | 6/1991 | Ubhayakar |
| 5,022,812 A | 6/1991 | Coughlan |
| 5,046,914 A | 9/1991 | Holland et al. |
| 5,080,000 A | 1/1992 | Bubic |
| 5,130,631 A | 7/1992 | Gordon |
| 5,142,932 A | 9/1992 | Moya |
| 5,174,168 A | 12/1992 | Takagi |
| 5,174,405 A | 12/1992 | Carra |
| 5,186,526 A | 2/1993 | Pennington |
| 5,199,771 A | 4/1993 | James |
| 5,205,612 A | 4/1993 | Sugden et al. |
| 5,214,858 A | 6/1993 | Pepper |
| 5,219,264 A | 6/1993 | McClure et al. |
| 5,252,870 A | 10/1993 | Jacobsen |
| 5,297,443 A | 3/1994 | Wentz |
| 5,317,952 A | 6/1994 | Immega |
| 5,337,732 A | 8/1994 | Grundfest |
| 5,337,846 A | 8/1994 | Ogaki et al. |
| 5,350,033 A | 9/1994 | Kraft |
| 5,354,124 A | 10/1994 | James |
| 5,363,935 A * | 11/1994 | Schempf et al. ............... 180/9.1 |
| 5,386,741 A | 2/1995 | Rennex |
| 5,413,454 A | 5/1995 | Movsesian |
| 5,426,336 A | 6/1995 | Jacobsen |
| 5,428,713 A * | 6/1995 | Matsumaru .................. 700/245 |
| 5,435,405 A | 7/1995 | Schempf |
| 5,440,916 A | 8/1995 | Stone et al. |
| 5,443,354 A | 8/1995 | Stone et al. |
| 5,451,135 A | 9/1995 | Schempf |
| 5,465,525 A | 11/1995 | Mifune |
| 5,466,056 A | 11/1995 | James |
| 5,469,756 A | 11/1995 | Feiten |
| 5,516,249 A | 5/1996 | Brimhall |
| 5,519,814 A | 5/1996 | Rodriguez et al. |
| 5,551,545 A | 9/1996 | Gelfman |
| 5,556,370 A | 9/1996 | Maynard |
| 5,562,843 A | 10/1996 | Yasumoto |
| 5,567,110 A | 10/1996 | Sutherland |
| 5,570,992 A | 11/1996 | Lemelson |
| 5,573,316 A | 11/1996 | Wankowski |
| 5,588,688 A | 12/1996 | Jacobsen |
| 5,672,044 A | 9/1997 | Lemelson |
| 5,697,285 A | 12/1997 | Nappi |
| 5,712,961 A | 1/1998 | Matsuo |
| 5,749,828 A | 5/1998 | Solomon |
| 5,770,913 A | 6/1998 | Mizzi |
| 5,816,769 A | 10/1998 | bauer |
| 5,821,666 A | 10/1998 | Matsumoto |
| 5,842,381 A | 12/1998 | Feiten |
| RE36,025 E | 1/1999 | Suzuki |
| 5,878,783 A | 3/1999 | Smart |
| 5,888,235 A | 3/1999 | Jacobsen et al. |
| 5,902,254 A | 5/1999 | Magram |
| 5,906,591 A | 5/1999 | Dario |
| 5,984,032 A | 11/1999 | Gremillion |
| 5,996,346 A | 12/1999 | Maynard |
| 6,016,385 A | 1/2000 | Yee |
| 6,030,057 A | 2/2000 | Fikse |
| 6,056,237 A | 5/2000 | Woodland |
| 6,107,795 A | 8/2000 | Smart |
| 6,109,705 A | 8/2000 | Courtemanche |
| 6,113,343 A | 9/2000 | Goldenberg et al. |
| 6,132,133 A | 10/2000 | Muro et al. |
| 6,138,604 A | 10/2000 | Anderson |
| 6,162,171 A | 12/2000 | Ng |
| 6,186,604 B1 | 2/2001 | Fikse |
| 6,203,126 B1 | 3/2001 | Harguth |
| 6,260,501 B1 | 7/2001 | Agnew |
| 6,263,989 B1 | 7/2001 | Won |
| 6,264,293 B1 | 7/2001 | Musselman |
| 6,264,294 B1 | 7/2001 | Musselman et al. |
| 6,281,489 B1 | 8/2001 | Tubel et al. |
| 6,323,615 B1 | 11/2001 | Khairallah |
| 6,325,749 B1 | 12/2001 | Inokuchi et al. |
| 6,333,631 B1 | 12/2001 | Das et al. |
| 6,339,993 B1 | 1/2002 | Comello |
| 6,380,889 B1 | 4/2002 | Herrmann et al. |
| 6,394,204 B1 | 5/2002 | Haringer |
| 6,405,798 B1 | 6/2002 | Barrett et al. |
| 6,408,224 B1 | 6/2002 | Okamoto |
| 6,411,055 B1 | 6/2002 | Fujita |
| 6,422,509 B1 | 7/2002 | Yim |
| 6,430,475 B2 | 8/2002 | Okamoto |
| 6,431,296 B1 | 8/2002 | Won |

| Patent Number | Date | Name |
|---|---|---|
| 6,446,718 B1 | 9/2002 | Barrett et al. |
| 6,450,104 B1 | 9/2002 | Grant |
| 6,477,444 B1 | 11/2002 | Bennett et al. |
| 6,484,083 B1 | 11/2002 | Hayward |
| 6,488,306 B1 | 12/2002 | Shirey et al. |
| 6,505,896 B1 | 1/2003 | Boivin |
| 6,512,345 B2 | 1/2003 | Borenstein |
| 6,522,950 B1 | 2/2003 | Conca et al. |
| 6,523,629 B1 | 2/2003 | Buttz |
| 6,529,806 B1 | 3/2003 | Licht |
| 6,535,793 B2 | 3/2003 | Allard |
| 6,540,310 B1 | 4/2003 | Cartwright |
| 6,557,954 B1 | 5/2003 | Hattori |
| 6,563,084 B1 | 5/2003 | Bandy |
| 6,574,958 B1 | 6/2003 | Macgregor |
| 6,576,406 B1 | 6/2003 | Jacobsen et al. |
| 6,595,812 B1 | 7/2003 | Haney |
| 6,610,007 B2 | 8/2003 | Belson et al. |
| 6,619,146 B2 | 9/2003 | Kerrebrock |
| 6,636,781 B1 | 10/2003 | Shen et al. |
| 6,651,804 B2 | 11/2003 | Thomas |
| 6,652,164 B2 | 11/2003 | Stiepel et al. |
| 6,668,951 B2 | 12/2003 | Won |
| 6,708,068 B1 | 3/2004 | Sakaue |
| 6,715,575 B2 | 4/2004 | Karpik |
| 6,725,128 B2 | 4/2004 | Hogg et al. |
| 6,772,673 B2 | 8/2004 | Seto |
| 6,773,327 B1 | 8/2004 | Felice |
| 6,774,597 B1 | 8/2004 | Borenstein |
| 6,799,815 B2 | 10/2004 | Krishnan |
| 6,820,653 B1 | 11/2004 | Schempf |
| 6,831,436 B2 | 12/2004 | Gonzalez |
| 6,835,173 B2 | 12/2004 | Couvillon, Jr. |
| 6,837,318 B1 | 1/2005 | Craig |
| 6,840,588 B2 | 1/2005 | Deland |
| 6,866,671 B2 | 3/2005 | Tierney |
| 6,870,343 B2 | 3/2005 | Borenstein |
| 6,889,118 B2 | 5/2005 | Murray et al. |
| 6,917,176 B2 | 7/2005 | Schempf |
| 6,923,693 B2 | 8/2005 | Borgen |
| 6,936,003 B2 | 8/2005 | Iddan |
| 6,959,231 B2 | 10/2005 | Maeda |
| 7,020,701 B1 | 3/2006 | Gelvin et al. |
| 7,040,426 B1 | 5/2006 | Berg |
| 7,044,245 B2 | 5/2006 | Anhalt et al. |
| 7,069,124 B1 | 6/2006 | Whittaker et al. |
| 7,090,637 B2 | 8/2006 | Dankitz et al. |
| 7,137,465 B1 | 11/2006 | Kerrebrock |
| 7,144,057 B1 | 12/2006 | Young et al. |
| 7,171,279 B2 | 1/2007 | Buckingham et al. |
| 7,188,473 B1 | 3/2007 | Asada |
| 7,188,568 B2 | 3/2007 | Stout |
| 7,228,203 B2 | 6/2007 | Koselka et al. |
| 7,235,046 B2 | 6/2007 | Anhalt et al. |
| 7,331,436 B1 | 2/2008 | Pack et al. |
| 7,387,179 B2 | 6/2008 | Anhalt et al. |
| 7,415,321 B2 | 8/2008 | Okazaki et al. |
| 7,475,745 B1 | 1/2009 | DeRoos |
| 7,546,912 B1 | 6/2009 | Pack et al. |
| 7,597,162 B2 | 10/2009 | Won |
| 7,600,592 B2 | 10/2009 | Goldenberg et al. |
| 7,645,110 B2 | 1/2010 | Ogawa et al. |
| 7,654,348 B2 | 2/2010 | Ohm et al. |
| 7,775,312 B2 | 8/2010 | Maggio |
| 7,798,264 B2 | 9/2010 | Hutcheson et al. |
| 7,843,431 B2 | 11/2010 | Robbins et al. |
| 7,845,440 B2 * | 12/2010 | Jacobsen .................. 180/9.46 |
| 7,860,614 B1 | 12/2010 | Reger |
| 7,974,736 B2 | 7/2011 | Morin et al. |
| 8,042,630 B2 * | 10/2011 | Jacobsen .................. 180/9.46 |
| 8,162,410 B2 | 4/2012 | Hirose et al. |
| 8,205,695 B2 * | 6/2012 | Jacobsen et al. ............ 180/9.1 |
| 2001/0037163 A1 | 11/2001 | Allard |
| 2002/0038168 A1 | 3/2002 | Kasuga et al. |
| 2002/0128714 A1 | 9/2002 | Manasas et al. |
| 2002/0140392 A1 | 10/2002 | Borenstein |
| 2002/0189871 A1 | 12/2002 | Won |
| 2003/0000747 A1 | 1/2003 | Sugiyama |
| 2003/0069474 A1 | 4/2003 | Couvillon, Jr. |
| 2003/0097080 A1 | 5/2003 | Esashi |
| 2003/0110938 A1 | 6/2003 | Seto |
| 2003/0223844 A1 | 12/2003 | Schiele |
| 2004/0030571 A1 | 2/2004 | Solomon |
| 2004/0099175 A1 | 5/2004 | Perrot et al. |
| 2004/0103740 A1 | 6/2004 | Townsend |
| 2004/0168837 A1 | 9/2004 | Michaud |
| 2004/0216931 A1 | 11/2004 | Won |
| 2004/0216932 A1 | 11/2004 | Giovanetti |
| 2005/0007055 A1 | 1/2005 | Borenstein |
| 2005/0027412 A1 | 2/2005 | Hobson |
| 2005/0085693 A1 | 4/2005 | Belson et al. |
| 2005/0107669 A1 | 5/2005 | Couvillon, Jr. |
| 2005/0115337 A1 | 6/2005 | Tarumi |
| 2005/0166413 A1 | 8/2005 | Crampton |
| 2005/0168068 A1 | 8/2005 | Courtemanche et al. |
| 2005/0168070 A1 | 8/2005 | Dandurand |
| 2005/0225162 A1 | 10/2005 | Gibbins |
| 2005/0235898 A1 | 10/2005 | Hobson |
| 2005/0235899 A1 | 10/2005 | Yamamoto |
| 2005/0288819 A1 | 12/2005 | de Guzman |
| 2006/0000137 A1 | 1/2006 | Valdivia y Alvarado |
| 2006/0005733 A1 | 1/2006 | Rastegar |
| 2006/0010702 A1 | 1/2006 | Roth |
| 2006/0070775 A1 | 4/2006 | Anhalt |
| 2006/0117324 A1 | 6/2006 | Alsafadi et al. |
| 2006/0156851 A1 | 7/2006 | Jacobsen |
| 2006/0225928 A1 | 10/2006 | Nelson |
| 2006/0229773 A1 | 10/2006 | Peretz |
| 2006/0290779 A1 | 12/2006 | Reverte et al. |
| 2007/0029117 A1 | 2/2007 | Goldenberg et al. |
| 2007/0156286 A1 | 7/2007 | Yamauchi |
| 2007/0193790 A1 | 8/2007 | Goldenberg et al. |
| 2007/0260378 A1 | 11/2007 | Clodfelter |
| 2007/0293989 A1 | 12/2007 | Norris |
| 2008/0115687 A1 | 5/2008 | Gal et al. |
| 2008/0164079 A1 | 7/2008 | Jacobsen |
| 2008/0167752 A1 | 7/2008 | Jacobsen |
| 2008/0168070 A1 | 7/2008 | Naphade |
| 2008/0215185 A1 | 9/2008 | Jacobsen |
| 2008/0272647 A9 | 11/2008 | Hirose et al. |
| 2008/0284244 A1 | 11/2008 | Hirose et al. |
| 2009/0035097 A1 | 2/2009 | Loane |
| 2009/0171151 A1 | 7/2009 | Choset et al. |
| 2009/0212157 A1 | 8/2009 | Arlton et al. |
| 2010/0030377 A1 | 2/2010 | Unsworth |
| 2010/0036544 A1 | 2/2010 | Mashiach |
| 2010/0258365 A1 * | 10/2010 | Jacobsen .................. 180/9.1 |
| 2010/0268470 A1 | 10/2010 | Kamal et al. |
| 2010/0318242 A1 * | 12/2010 | Jacobsen et al. .............. 701/2 |
| 2012/0205168 A1 * | 8/2012 | Flynn et al. .................. 180/9.1 |

FOREIGN PATENT DOCUMENTS

| | | |
|---|---|---|
| CN | 2774717 | 4/2006 |
| CN | 1970373 | 5/2007 |
| DE | 3025840 | 2/1982 |
| DE | 3626238 | 2/1988 |
| DE | 19617852 | 10/1997 |
| DE | 19714464 | 10/1997 |
| DE | 19704080 | 8/1998 |
| DE | 10018075 | 1/2001 |
| DE | 102004010089 | 9/2005 |
| EP | 0105418 | 4/1984 |
| EP | 0584520 | 3/1994 |
| EP | 0818283 | 1/1998 |
| EP | 0924034 | 6/1999 |
| EP | 1444043 | 8/2004 |
| EP | 1510896 | 3/2005 |
| EP | 1832501 | 9/2007 |
| EP | 1832502 | 9/2007 |
| FR | 2638813 | 5/1990 |
| FR | 2850350 | 7/2004 |
| GB | 1199729 | 7/1970 |
| JP | 51-106391 | 8/1976 |
| JP | 52 57625 | 5/1977 |
| JP | HEI 52-122431 | 10/1977 |
| JP | 58-89480 | 5/1983 |
| JP | SHO 58-80387 | 5/1983 |
| JP | HEI 59-139494 | 8/1984 |

| | | |
|---|---|---|
| JP | 60015275 | 1/1985 |
| JP | 60047771 | 3/1985 |
| JP | 60060516 | 4/1985 |
| JP | 60139576 | 7/1985 |
| JP | 61001581 | 1/1986 |
| JP | SHO 61-1581 | 1/1986 |
| JP | SHO61-020484 | 2/1986 |
| JP | SHO61-054378 | 3/1986 |
| JP | SHO61-075069 | 4/1986 |
| JP | 61089182 | 5/1986 |
| JP | 62165207 | 7/1987 |
| JP | 62-162626 | 10/1987 |
| JP | SHO 63-32084 | 3/1988 |
| JP | 63306988 | 12/1988 |
| JP | 04092784 | 3/1992 |
| JP | 4126656 | 4/1992 |
| JP | HEI 5-3087 | 1/1993 |
| JP | 05147560 | 6/1993 |
| JP | HEI05-270454 | 10/1993 |
| JP | HEI 5-286460 | 11/1993 |
| JP | 06-115465 | 4/1994 |
| JP | HEI 8-133141 | 11/1994 |
| JP | 2007-216936 | 8/1995 |
| JP | 7329841 | 12/1995 |
| JP | HEI 7-329837 | 12/1995 |
| JP | HEI 9-142347 | 6/1997 |
| JP | 2003-237618 | 2/2002 |
| JP | 2003-019985 | 1/2003 |
| JP | 2003-315486 | 11/2003 |
| JP | 03535508 | 6/2004 |
| JP | 2004536634 | 12/2004 |
| JP | 2005-081447 | 3/2005 |
| JP | 2005111595 | 4/2005 |
| JP | 2006510496 | 3/2006 |
| JP | 2007-237991 | 9/2007 |
| WO | WO 87/02635 | 5/1987 |
| WO | WO97/26039 | 7/1997 |
| WO | WO 00/10073 | 2/2000 |
| WO | WO 2000/10073 | 2/2000 |
| WO | WO02/16995 | 2/2002 |
| WO | WO 02/095517 | 11/2002 |
| WO | WO03/030727 | 4/2003 |
| WO | WO03037515 | 5/2003 |
| WO | WO 2004/056537 | 7/2004 |
| WO | WO2005/018428 | 3/2005 |
| WO | WO2006068080 | 6/2006 |
| WO | WO2008/049050 | 4/2008 |
| WO | WO2008/076194 | 6/2008 |
| WO | WO 2008/135978 | 11/2008 |
| WO | WO2009/009673 | 1/2009 |

OTHER PUBLICATIONS

U.S. Appl. No. 13/181,380, filed Jul. 12, 2011; Stephen C. Jacobsen; office action dated Jul. 17, 2012.
U.S. Appl. No. 12/814,302, filed Jun. 11, 2010; Stephen C. Jacobsen; notice of allowance dated Jul. 25, 2012.
Arnold, Henry, "Cricket the robot documentation." online manual available at http://www.parallaxinc.com, 22 pages.
Iagnemma, Karl et al., "Traction control of wheeled robotic vehicles in rough terrain with application to planetary rovers." International Journal of Robotics Research, Oct.-Nov. 2004, pp. 1029-1040, vol. 23, No. 10-11.
Hirose, et al., "Snakes and strings; new robotic components for rescue operations," International Journal of Robotics Research, Apr.-May 2004, pp. 341-349, vol. 23, No. 4-5.
Paap et al., "A robot snake to inspect broken buildings," IEEE, 2000, pp. 2079-2082, Japan.
Braure, Jerome, "Participation to the construction of a salamander robot: exploration of the morphological configuration and the locomotion controller", Biologically Inspired Robotics Group, master thesis, Feb. 17, 2004, pp. 1-46.
Jacobsen, et al., Advanced intelligent mechanical sensors (AIMS), Proc. IEEE Trandsucers, Jun. 24-27, 1991, abstract only, San Fransico, CA.
Jacobsen, et al., "Research robots for applications in artificial intelligence, teleoperation and entertainment", International Journal of Robotics Research, 2004, pp. 319-330, vol. 23.
Jacobsen, et al., "Multiregime MEMS sensor networks for smart structures," Procs. SPIE 6th Annual Inter. Conf. on Smart Structues and Materials, Mar. 1-5, 1999, pp. 19-32, vol. 3673, Newport Beach CA.
MacLean et al., "A digital MEMS-based strain gage for structural health monitoring," Procs. 1997 MRS Fall Meeting Symposium, Nov. 30-Dec. 4, 1997, pp. 309-320, Boston Massachusetts.
Berlin et al., "MEMS-based control of structural dynamic instability", Journal of Intelligent Material Systems and Structures, Jul. 1998 pp. 574-586, vol. 9.
Goldfarb, "Design and energetic characterization of a liquid-propellant-powered actuator for self-powered robots," IEEE Transactions on Mechatronics, Jun. 2003, vol. 8 No. 2.
Dowling, "Limbless Locomotion: Learning to crawl with a snake robot," The Robotics Institute at Carnegie Mellon University, Dec. 1997, pp. 1-150.
Jacobsen, Stephen; U.S. Appl. No. 11/985,320, filed Nov. 13, 2007; published as US-2008-0215185; published Sep. 4, 2008; issued as patent No. 7,845,440 on Dec. 7, 2010.
Jacobsen, Stephen, U.S. Appl. No. 11/985,346, filed Nov. 13, 2007; published as US-2008-0136254 on Jun. 12, 2008.
Jacobsen, Stephen; U.S. Appl. No. 11/985,324, filed Nov. 13, 2007; published as US-2008-0217993-A1; published Sep. 11, 2008; Aug. 28, 2011 as 8,002,365; issued as patent No. 8,002,365 on Aug. 23, 2011.
Jacobsen, Stephen; U.S. Appl. No. 11/985,323, filed Nov. 13, 2007; published as US-2008-0164079 on Jul. 10, 2008; issued as patent No. 7,845,440 on Dec. 7, 2010.
Jacobsen, Stephen; U.S. Appl. No. 12/171,144, filed Jul. 10, 2008; published as US-2009-0025988 on Jan. 29, 2009; issued Jul. 10, 2011 as 7,845,440.
Jacobsen, Stephen; U.S. Appl. No. 12/171,146, filed Jul. 10, 2008; published as US-2009-0030562 on Jan. 29, 2009.
Jacobsen, Stephen, U.S. Appl. No. 12/151,730, filed May 7, 2008; published as US-2008-0281231 on Nov. 13, 2008; issued Aug. 13, 2011 as 8,002,716.
Jacobsen, Stephen, U.S. Appl. No. 12/117,233, filed May 8, 2008; published as US-2008-0281468-A1on Nov. 13, 2008.
Jacobsen, Stephen, U.S. Appl. No. 11/293,701, filed Dec. 1, 2005; published as US-2006-0156851-A1on Jul. 20, 2006.
Jacobsen, Stephen, U.S. Appl. No. 11/985,336, filed Nov. 13, 2007; published as US-2008-0167752-A1on Jul. 10, 2008; issued as patent 8,185,241 on May 22, 2012.
Jacobsen, Stephen, U.S. Appl. No. 12/350,693, filed Jan. 8, 2009; published as US-2010-0174422-A1on Jul. 8, 2010.
Jacobsen, Stephen; U.S. Appl. No. 12/694,996, filed Jan. 27, 2010; published as US-2010-0201187 on Jul. 12, 2010.
Jacobsen, Stephen; U.S. Appl. No. 12/814,302, filed Jun. 11, 2010; published as US2010-0317244 on Dec. 16, 2010.
Jacobsen, Stephen; U.S. Appl. No. 12/814,304; filed Jun. 11, 2010; published as US-2010-0318242 on Dec. 16, 2010.
Jacobsen, Stephen; U.S. Appl. No. 12/820,881, filed Apr. 22, 2010; published as US-2010-0201185 on Aug. 12, 2010; issued as patent No. 8,042,630 on Oct. 25, 2011.
Jacobsen, Stephen; U.S. Appl. No. 12/765,618, filed Apr. 22, 2010; published as US-2010-0201185-A1on Aug. 12, 2010.
Matthew Heverly & Jaret Matthews: "A wheel-on-limb rover for lunar operation" Internet article, Nov. 5, 2008, pp. 1-8, http://robotics.estec.esa.int/i-SAIRAS/isairas2008/Proceedings/SES-SION%2026/m116-Heverly.pdf.
NASA: "NASA's newest concept vehicles take off-roading out of this world" Internet article, Nov. 5, 2008, http://www.nasa.gov/mission_pages/constellation/main/lunar_truck.html.
Revue Internationale De defense, "3-D vision and urchin" Oct. 1, 1988, p. 1292, vol. 21, No. 10, Geneve CH.
Advertisement, International Defense review, Jane's information group, Nov. 1, 1990, p. 54, vol. 23, No. 11, Great Britain.
Ren Luo "Development of a multibehavior-based mobile robot for remote supervisory control through the internet" IEEE/ASME Transactions on mechatronics, IEEE Service Center, Piscataway, NY, Dec. 1, 2000, vol. 5, No. 4.

Nilas Sueset et al., "A PDA-based high-level human-robot interaction" Robotics, Automation and Mechatronics, IEEE Conference Singapore, Dec. 1-3, 2004, vol. 2, pp. 1158-1163.
Jacobsen, Stephen; U.S. Appl. No. 13/181,380, filed Jul. 12, 2011.
U.S. Appl. No. 12/814,304, filed Jun. 11, 2010; Stephen C. Jacobsen; office action dated Nov. 13, 2012.
U.S. Appl. No. 12/117,233, filed May 8, 2008; Stephen C. Jacobsen. office action dated Nov. 23, 2012.
U.S. Appl. No. 12/350,693, filed Jan. 8, 2009; Stephen C. Jacobsen; Notice of Allowance issued Sep. 20, 2012.

Celaya et al; Control of a Six-Legged Robot Walking on Abrupt Terrain; Proceedings of the 1996 IEE International Conference on Robotics and Automation, Minneapolis, Minnesota; Apr. 1996; 6 pages.
Burg et al; Anti-Lock Braking and Traction Control Concept for All-Terrain Robotic Vehicles; Proceedings of the 1997 IEE International Conference on Robotics and Automation; Albuquerque, New Mexico; Apr. 1997; 6 pages.

* cited by examiner

SERPENTINE ROBOTIC CRAWLER

BACKGROUND

Robotics is an active area of research, and many different types of robotic vehicles have been developed for various tasks. For example, unmanned aerial vehicles have been quite successful in military aerial reconnaissance. Less success has been achieved with unmanned ground vehicles, however, in part because the ground environment is significantly more difficult to traverse than the airborne environment.

Unmanned ground vehicles face many challenges when attempting mobility. Terrain can vary widely, including for example, loose and shifting materials, obstacles, vegetation, limited width or height openings, steps, and the like. A vehicle optimized for operation in one environment may perform poorly in other environments.

There are also tradeoffs associated with the size of vehicle. Large vehicles can handle some obstacles better, including for example steps, drops, gaps, and the like. On the other hand, large vehicles cannot easily negotiate narrow passages or crawl inside pipes, and are more easily deterred by vegetation. Large vehicles also tend to be more readily spotted, and thus can be less desirable, such as for discrete surveillance applications. In contrast, while small vehicles are more discrete, surmounting obstacles becomes a greater navigational challenge.

A variety of mobility configurations have been adapted to traverse difficult terrain. These options include legs, wheels, and tracks. Legged robots can be agile, but use complex control mechanisms to move and achieve stability. Wheeled vehicles can provide high mobility, but provide limited traction and require width in order to achieve stability.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1A:
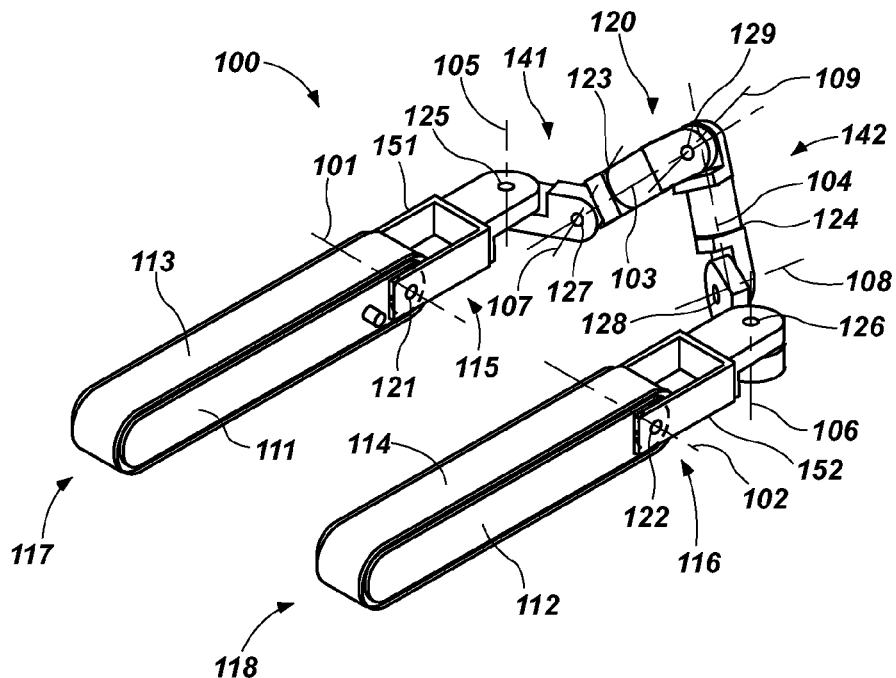
FIG. 1A is an example illustration of a serpentine robotic crawler in accordance with an example of the present disclosure.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Tracked vehicles are known and have traditionally been configured in a tank-like configuration. While tracked vehicles can provide a high degree of stability in some environments, tracked vehicles typically provide limited maneuverability with very small vehicles. Furthermore, many known tracked vehicles are unable to accommodate a wide variety of obstacles, particularly when the terrain is narrow and the paths are tortuous and winding. Additionally, linkages or couplings between tracks of a vehicle can come into contact with obstacles and can even become lodged on the obstacles, thus hindering movement of the vehicle.

Accordingly, a serpentine robotic crawler is disclosed that allows movement of a linkage arm. In one aspect, the linkage arm can be moved to expose leading and/or trailing ends of the track to increase the ability of the tracked vehicle to overcome obstacles. In some exemplary embodiments, the serpentine robotic crawler can include a first frame having a first continuous track rotatably supported by the first frame, a second frame having a second continuous track rotatably supported by the second frame, and a linkage arm coupling the first and second frames together in tandem. The linkage arm can have a first elbow-like joint formed by an interface between the first frame and a first linkage member, a second elbow-like joint formed by an interface between the second frame and a second linkage member, a first wrist-like actuated linkage coupled to the first linkage member, a second wrist-like actuated linkage coupled to the second linkage member, and an actuated third elbow-like joint formed by a coupling of the first wrist-like actuated linkage and the second wrist-like actuated linkage. The first wrist-like actuated linkage can include actuated joints that provide rotational movement about a longitudinal axis and bending movement about two different lateral axes. The second wrist-like actuated linkage can include actuated joints that provide rotational movement about a longitudinal axis and bending movement about two different lateral axes. The third elbow-like joint can provide bending movement about a lateral axis. The first linkage member can be positionable via first elbow-like joint to locate the first wrist-like actuated linkage out of plane from the first frame. The second linkage member can be positionable via second elbow-like joint to locate the second wrist-like actuated linkage out of plane from the second frame.

Other exemplary embodiments of a serpentine robotic crawler are also disclosed that can include a first frame having a first continuous track rotatably supported by the first frame, a second frame having a second continuous track rotatably supported by the second frame, and a linkage arm coupling the first and second frames together in tandem. The linkage arm can also be movable about a first lateral axis associated with the first frame, a second lateral axis associated with the second frame, and at least two longitudinal axes, which longitudinal axes can be oriented or moved by movement of the linkage arm about at least one of the first lateral axis and the second lateral axis. Movement about the first lateral axis and the second lateral axis can allow for or facilitate exposure of leading and trailing ends of each continuous track.

Additionally, still other exemplary embodiments of a serpentine robotic crawler are disclosed that can include a first frame having a first continuous track rotatably supported by the first frame, a second frame having a second continuous track rotatably supported by the second frame, and a linkage arm coupling the first and second frames together in tandem. The linkage arm can have a first wrist-like actuated linkage coupled to the first frame, a second wrist-like actuated linkage coupled to the second frame, and an elbow-like actuated joint formed by a coupling of the first wrist-like actuated linkage and the second wrist-like actuated linkage. The first wrist-like actuated linkage can include actuated joints that provide rotational movement about a longitudinal axis and bending movement about two different lateral axes. The second wrist-like actuated linkage can include actuated joints that provide rotational movement about a longitudinal axis and bending movement about two different lateral axes. The elbow-like actuated joint can provide bending movement about a lateral axis. The first wrist-like actuated linkage can be located or positioned out of plane from the first frame and the second wrist-like actuated linkage can be located or positioned out of plane from the second frame, wherein these are in a fixed or non-movable position relative to the respective frames.

Figure 1B:
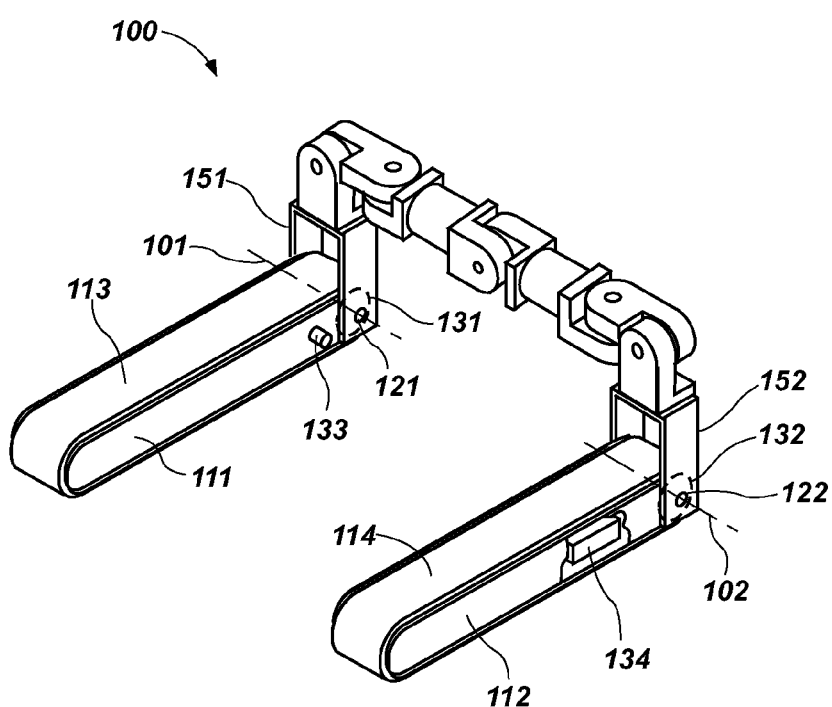
FIG. 1B is the serpentine robotic crawler of FIG. 1A, with a linkage arm moved to expose ends of continuous tracks in a tank configuration.

One exemplary embodiment of a serpentine robotic crawler is illustrated in FIGS. 1A and 1B. The serpentine robotic crawler 100 can include a first frame 111 and a second frame 112. The first frame 111 can have a first continuous track 113 rotatably supported by the first frame 111 and the second frame 112 can have a second continuous track 114 rotatably supported by the second frame 112. The serpentine robotic crawler 100 can also include a linkage arm 120 coupling the first and second frames 111, 112 together in tandem. The linkage arm 120 can be movable about several axes. For example, the linkage arm 120 can be movable about a first lateral axis 101 (extending through the first elbow-like joint 121) associated with the first frame 111, a second lateral axis 102 (extending through the second elbow-like joint 122) associated with the second frame 112, and at least two longitudinal axes 103, 104. The longitudinal axes 103, 104 can be oriented by movement of the linkage arm 120 about at least one of the first lateral axis 101 and the second lateral axis 102. Movement of the linkage arm 120 about the first lateral axis 101 and the second lateral axis 102 can allow exposure or greater exposure of the ends 115, 116 of each continuous track, which can be leading or trailing ends, depending on the direction of travel.

For example, as illustrated in FIG. 1A, the linkage arm 120 may be positioned to obscure or cover the ends 115, 116 of the first and second continuous tracks 113, 114, respectively. As illustrated in FIG. 1B, movement of the linkage arm 120 about the first lateral axis 101 and/or the second lateral axis 102 can uncover, or expose, at least one of the ends 115, 116 of the continuous tracks 113, 114. With the linkage arm 120 moved out of the way, relative to the configuration illustrated in FIG. 1A, the ends of the tracks can engage obstacles, which can increase the locomotion capabilities of the serpentine robotic crawler, such as its ability to maneuver over uneven terrain. Positioning the linkage arm 120 in an elevated position, as shown in FIG. 1B, moving continuous tracks 113, 114 can contact obstacles, as opposed to the obstacles contacting a stationary structure of the serpentine robotic crawler 100, such as a portion of the linkage arm 120. Moving tracks can therefore be the dominant structure in contact with a terrain surface. The configuration illustrated in FIG. 1B can minimize the likelihood of the linkage arm 120 being "hung up" or "high-centered" on obstacles.

As discussed further herein, movement of the linkage arm 120 about the first lateral axis 101 and/or the second lateral axis 102 can provide for a multitude of different configurations or poses of the serpentine robotic crawler 100. Furthermore, the linkage arm 120 can include movement about one or more of axes 105, 106, 107, 108, 109. These axes can provide for additional poses of the serpentine robotic crawler 100, which can further enhance maneuverability of the serpentine robotic crawler 100.

In one aspect, the linkage arm 120 can have a first elbow-like joint 121 formed by an interface between the first frame 111 and a first linkage member 151. Similarly, the linkage arm 120 can have a second elbow-like joint 122 formed by an interface between the second frame 112 and a second linkage member 152. The first and second elbow-like joints 121, 122 can provide for rotation of the first and second linkage members 151 and 152 about axes 101, 102, respectively. The linkage arm 120 can also include a first wrist-like linkage 141 coupled to the first linkage member 151. The first wrist-like linkage 141 can include joints 123, 125, 127 that can provide rotational movement about longitudinal axis 103 and bending movement about two different lateral axes 105, 107, respectively. In one aspect, the two different lateral axes 105, 107 can be at a substantially right angle to one another. Similarly, the linkage arm 120 can also include a second wrist-like linkage 142 coupled to the linkage member 152. The second wrist-like linkage 142 can include joints 124, 126, 128 that provide rotational movement about a longitudinal axis 104 and bending movement about two different lateral axes 106, 108, respectively. In one aspect, the two different lateral axes 106, 108 can be at a substantially right angle to one another.

Additionally, the linkage arm 120 can include a third elbow-like joint 129 formed by a coupling of the first wrist-like linkage 141 and the second wrist-like linkage 142. The third elbow-like joint 129 can provide bending movement about lateral axis 109. In one aspect, the first linkage member 151, via the first elbow-like joint 121, can be positionable to allow the first wrist-like linkage 141 to be out of plane from the first frame 111. Similarly, the second linkage member 152, via the second elbow-like joint 122, can be positionable to allow the second wrist-like actuated linkage 142 to be out of plane from the second frame 112.

In one aspect, the first lateral axis 101 and thus, the first elbow-like joint 121 can be located between the ends 115, 117 of the first continuous track 113. This can allow the movement about the first lateral axis 101 to effectively position the linkage arm 120 to expose the end 115 of the first continuous track 113. In a specific aspect, the first lateral axis 101 of the first elbow-like joint 121 can be coaxial with a drive wheel 131 for the first continuous track 113. The same can be the case for the location of the second lateral axis 102, as well. In another aspect, respective movement of the first and second linkage members 151 and 152 about the first lateral axis 101 and the second lateral axis 102 can be actuated. Alternatively, respective movement of the first and second linkage members 151 and 152 about the first lateral axis 101 and the second lateral axis 102 can be passive. Additionally, a range of motion of the first and second linkage members 151 and 152 about the first lateral axis 101 can be physically limited, such as by a mechanical stop 133, to prevent contact between at least a portion of the linkage arm 120 (such as linkage member 151) and the first continuous track 113. A similar range of motion limiter can also prevent contact between at least a portion of the linkage arm 120 (such as linkage member 152) and the second continuous track 114.

It should be recognized that the joints and/or linkages discussed herein can be actuated or passive, in any combination. In one aspect, a passive joint or linkage can be manipulated or movable to a selectively fixed position and held in place, for example, by incorporating an adjustable fastener. In another aspect, a passive joint or linkage can include a dampener and/or a spring to control various aspects (e.g., those related to movement) of the joint or linkage.

With respect to the linkage arm 120, various other configurations are also possible for embodiments of a serpentine robotic crawler. In general, the linkage arm 120 can include at least nine actuated joints providing motion about nine different axes (although some of these axes may be aligned with each other at times). These joints can be uni-axial, bi-axial, or tri-axial joints. The linkage arm can include a series coupled combination of any of the following:

9 uni-axial joints
5 uni-axial joints and 2 bi-axial joints
3 uni-axial joint and 2 tri-axial joints
2 uni-axial joints, 2 bi-axial joints, and 1 tri-axial joint For example, a linkage arm can include a series combination of seven uni-axial bending joints and two uni-axial rotary joints. For example, six bending joints can be symmetrically disposed about a seventh bending joint located in the center of the linkage, three bending joints on each side of the center. The rotary joints can also be symmetrically disposed about the center. For example, the rotary joints can be located adjacent to the seventh (centered) bending joint (e.g., as illustrated in FIG. 1A), located between the symmetrically disposed bending joints, or located adjacent to the frames.

Alternately, bi-axial joints, which provide the same degrees of freedom as two uni-axial joints in series, or tri-axial joints, which provide the same degrees of freedom as three uni-axial joints in series, can also be used. A bi-axial joint can, for example, provide bending in two axes. These axes can, but need not be, orthogonal. A tri-axial joint can, for example, provide bending in two lateral axes and rotation about a third longitudinal axis.

Joints need not be limited to revolute joints which provide bending or rotational movement. Prismatic joints which provide translational movement can also be included. Joints may incorporate both revolute and prismatic features to provide, for example, eccentric motions.

In one aspect, each of the first and second frames 111, 112 can include a drive coupled to the first and second continuous tracks, respectively, as illustrated by drive 134 of the second frame 112. In a particular aspect, the first elbow-like joint 121 and/or the second elbow-like joint 122 can be actuatable by one of the drives. In other words, the same drive that causes movement of a continuous track can also cause movement of an associated joint. In another aspect, the first elbow-like joint 121 and/or the second elbow-like joint 122 can be actuated to manipulate or move linkage members 151 and 152, respectively, by a dedicated drive that is distinct from the drive used to cause movement of the continuous tracks. A drive for a continuous track can be configured to drive the continuous track in either direction (e.g., clockwise and counterclockwise) over a range of speeds. As will be recognized by those skilled in the art, various types of drives and coupling techniques for applying drive power to a continuous track can be applied in embodiments of the present invention.

The combination of a multi-degree of freedom linkage arm 120 with the tracked frames 111, 112 can make the serpentine robotic crawler 100 capable of many different modes of movement. Operating the serpentine robotic crawler 100 can include articulating the linkage arm 120 to establish a desired pose for the serpentine robotic crawler 100. Drive operation of the continuous tracks 113, 114 can be coordinated with articulation of the linkage arm 120 to further control the pose and provide movement of the serpentine robotic crawler 100. When establishing a pose of the serpentine robotic crawler 100, torque and forces on the joints may be taken into account, as discussed further herein.

A first pose of the serpentine robotic crawler 100 will be referred to herein as the "tank" configuration, as illustrated in FIGS. 1A and 1B, where the first frame 111 and second frame 112 are positioned in a side by side or substantially side by side arrangement. The frames 111, 112 extend in the same direction from the linkage arm 120, and can be, but need not be, parallel, or even in the same elevation plane. The tank configuration provides lateral stability to the serpentine robotic crawler 100, for example when traversing a steep slope. In the tank configuration, the serpentine robotic crawler 100 can be controlled using "skid steer" techniques. For example, the serpentine robotic crawler 100 can be moved in a forward and reserve direction by driving the continuous tracks 113, 114 in the same direction, and turned by driving the continuous tracks 113, 114 in opposite directions. In general, moving the serpentine robotic crawler 100 in the tank-like configuration can involve applying different drive speeds (including opposite directions) to the continuous tracks 113, 114.

Figure 2A:
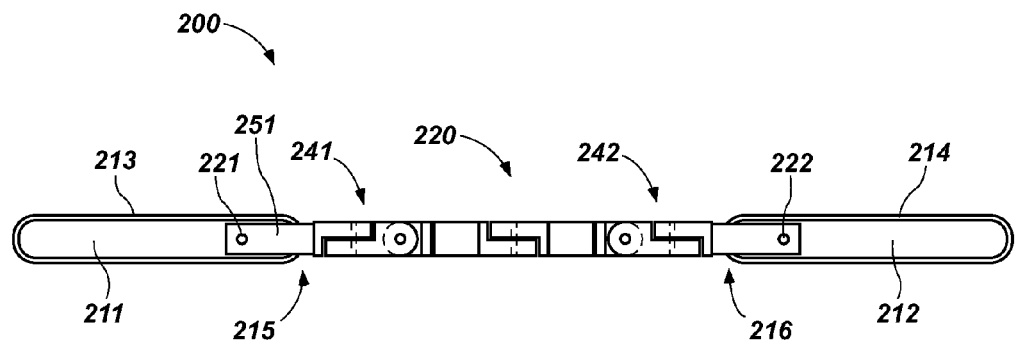
FIG. 2A is an example illustration of a serpentine robotic crawler in accordance with another example of the present disclosure.
Figure 2B:
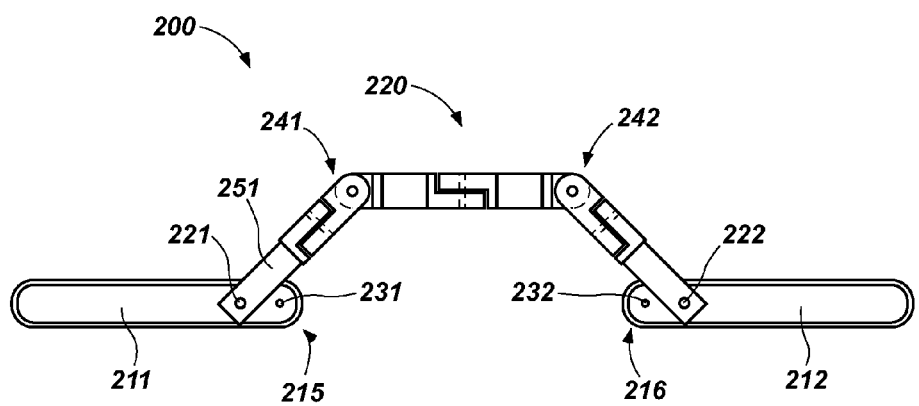
FIG. 2B is the serpentine robotic crawler of FIG. 2A, with a linkage arm moved to expose ends of continuous tracks in a train configuration.

A second pose of a serpentine robotic crawler 200 will be referred to herein as the "train" configuration, as illustrated in FIGS. 2A and 2B, where the first frame 211 and second frame 212 are extending in generally opposite directions. As illustrated in FIGS. 2A and 2B, the first and second frames 211, 212 are substantially aligned with one another in a direction of travel, however, the frames may be laterally offset from one another, as described below. The frames 211, 212 can be, but need not be, parallel, or in the same elevation plane. The train configuration can provide a smaller profile than the tank configuration, allowing the serpentine robotic crawler 200 to enter small holes, pipes, tunnels, and the like. The train configuration can also allow the serpentine robotic crawler 200 to bridge gaps and holes. In the train configuration, forward and reverse motion is provided by driving the continuous tracks 213, 214 in the same direction. Note that, relative to the tank configuration, the direction sense of one of the continuous tracks is reversed. Turning of the serpentine robotic crawler 200 can be provided by operation of the linkage arm 220 to create an angle between the first frame 211 and second frame 212.

The serpentine robotic crawler 200 is similar in many respects to the serpentine robotic crawler 100 illustrated in FIGS. 1A-1B, discussed above. However, unlike the serpentine robotic crawler 100, axes of rotation of first elbow-like joint 221 and second elbow-like joint 222 of the linkage arm 120 of serpentine robotic crawler 200 are not coaxial with drive wheel axes 231, 232 for the first continuous track 213 and the second continuous track 214, respectively. Rather, they are located at a position that is further inward toward the center of the frames 211, 212, respectively, as shown in FIG. 2B.

As illustrated in FIG. 2A, the linkage arm 220 may be positioned to obscure or cover the ends 215, 216 of the first and second continuous tracks 213, 214, respectively, when in the train configuration. For example, linkage member 251 can be positioned directly in front of the end 215 of the first continuous track, obscuring the end 215 of the continuous track. As illustrated in FIG. 2B, movement of the first linkage arm 251 about and by manipulation of the first elbow-like joint 221 and/or the second linkage arm 252 and the second elbow-like joint 222 of the linkage arm 220 can uncover, or expose, at least one of the ends 215, 216 of the continuous tracks 213, 214. For example, manipulation of the first elbow-like joint 221 can cause linkage member 251 to be moved or rotated from the end 215 of the continuous track to uncover or expose the end 215 of the continuous track. With the linkage arm 220 moved out of the way, the ends of the tracks can engage obstacles, which can increase the ability of the serpentine robotic crawler 200 to maneuver over uneven terrain, relative to the configuration illustrated in FIG. 2A. Although not discussed specifically, the same can be carried out with respect to the second elbow-like joint 222 and the second frame 212. The configuration illustrated in FIG. 2B can minimize the likelihood of the linkage arm 220 being "hung up" or "high-centered" on obstacles. Thus, in one aspect, the first elbow-like joint 221 can be manipulated to allow the first wrist-like linkage 241 to be out of plane from the first frame 211. Similarly, the second elbow-like joint 222 can be manipulated to allow the second wrist-like actuated linkage 242 to be out of plane from the second frame 212.

Figure 3:
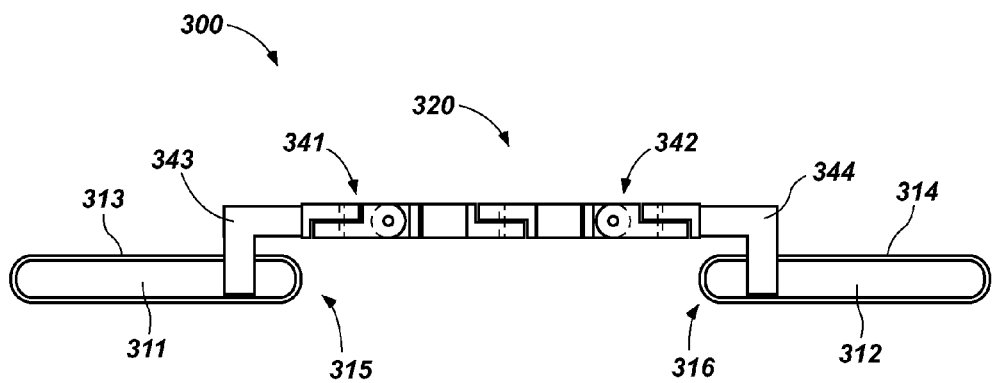
FIG. 3 is an example illustration of a serpentine robotic crawler in accordance with yet another example of the present disclosure.

With reference to FIG. 3, illustrated is a serpentine robotic crawler 300, in accordance with another example of the present disclosure. The serpentine robotic crawler 300 is similar in many respects to the serpentine robotic crawlers 100, 200 illustrated in FIGS. 1A-2B, discussed above. With regard to serpentine robotic crawler 300, however, first wrist-like linkage 341 is positioned out of plane from the first frame 311 without a linkage or joint. Similarly, second wrist-like linkage 342 is positioned out of plane from the second frame 312 without a linkage or joint. In this case, the first and second wrist-like linkages 341, 342 are positioned out of plane by brackets 343, 344, respectively, coupling the first and second wrist-like linages 341, 342 to their respective frames 311, 312. In one aspect, a portion of the brackets 343, 344 can be configured to extend upward from the frames 311, 312 to permanently position linkage arm 320 to expose at least one of the ends 315, 316 of the continuous tracks 313, 314. With the linkage arm 320 positioned out of the way, the ends 315, 316 of the tracks 313, 314 can engage obstacles, which can enhance the ability of the serpentine robotic crawler 300 to maneuver over uneven terrain, and can minimize the likelihood of the linkage arm 320 being "hung up" or "high-centered" on obstacles, similarly as provided by serpentine robotic crawlers 100, 200.

Figure 4A:
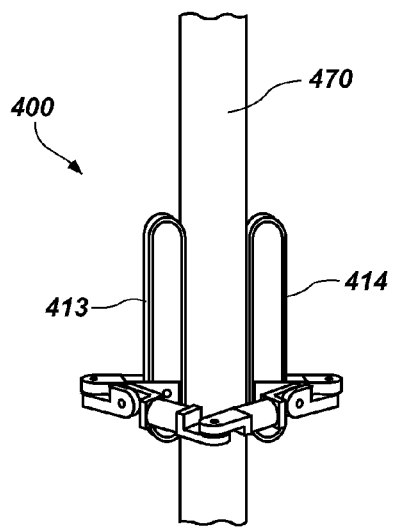
FIG. 4A is an example illustration of a serpentine robotic crawler in an outside-climbing configuration in accordance with an example of the present disclosure.

The serpentine robotic crawler can also be configured for climbing the exterior of various structures. As illustrated in FIG. 4A, the serpentine robotic crawler 400 is wrapped around structure 470 so that contact portions of the continuous tracks 413, 414 face toward each other and contact opposite outer surfaces of the structure 470. The continuous tracks 413, 414 can be driven to move the serpentine robotic crawler 400 up and down the structure 470. A wide variety of structural geometries including a pole, for example, can be climbed in this outside-climbing configuration.

Figure 4B:
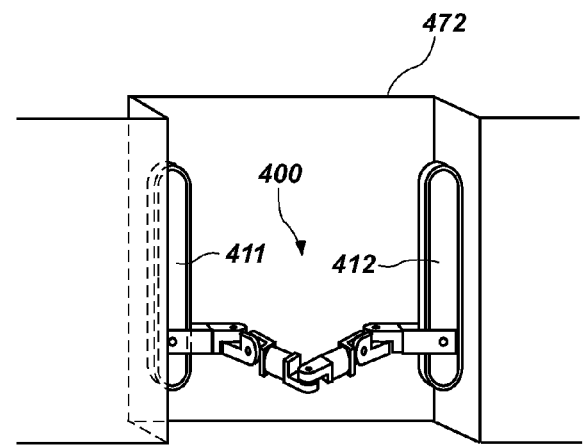
FIGS. 4B and 4C are example illustrations of a serpentine robotic crawler in different inside-climbing configurations in accordance with examples of the present disclosure.
Figure 4C:
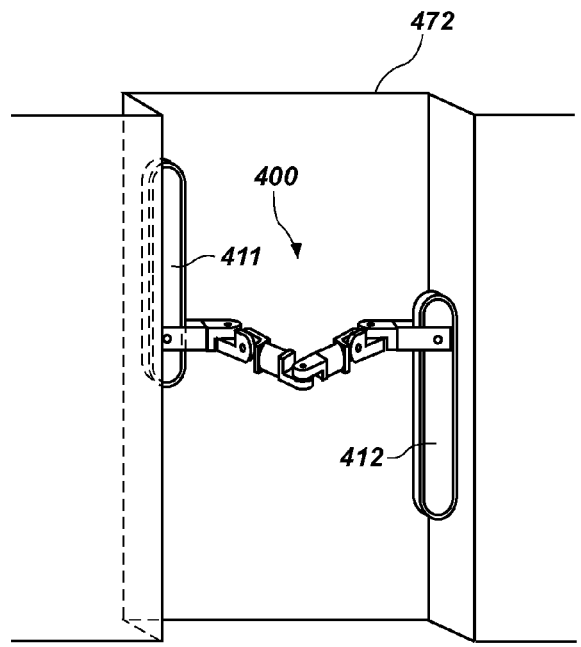

The serpentine robotic crawler 400 can also be configured for climbing the interior of a structure. FIGS. 4B and 4C illustrate two different inside-climbing configurations. In an inside-climbing configuration, the serpentine robotic crawler 400 can be configured so that contact portions of the continuous tracks 413, 414 face away from each other and are in contact with opposite inner surfaces of structure 472. In FIG. 4B, the serpentine robotic crawler 400 is in a modified tank configuration, with first and second frames 411, 412 extending in the same direction. In FIG. 4C, the serpentine robotic crawler 400 is in a modified train configuration, with first and second frames 411, 412 extending in opposite directions. The inside-climbing configuration can be useful for climbing pipes, chimneys, wall interiors, and the like.

Figure 5A:
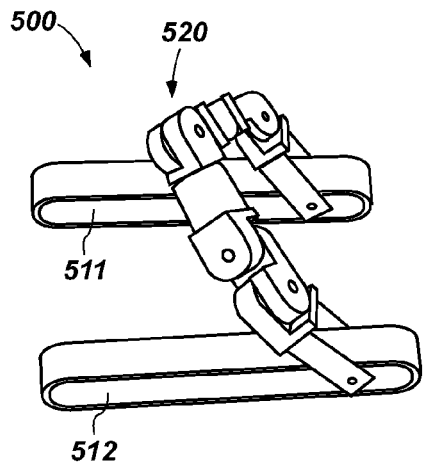
FIGS. 5A-5P illustrate perspective views of various poses for a serpentine robotic crawler in accordance with examples of the present disclosure.
Figure 5B:
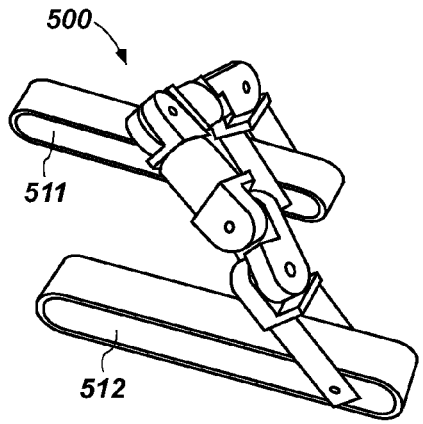
Figure 5C:
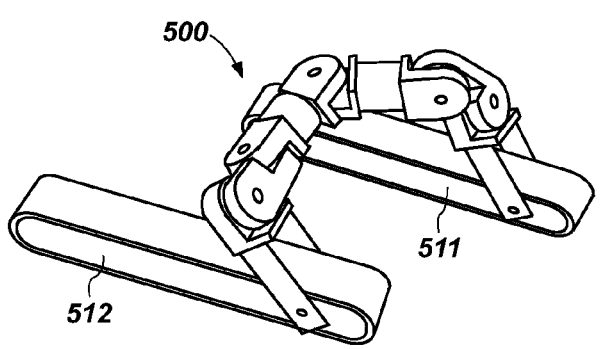
Figure 5D:
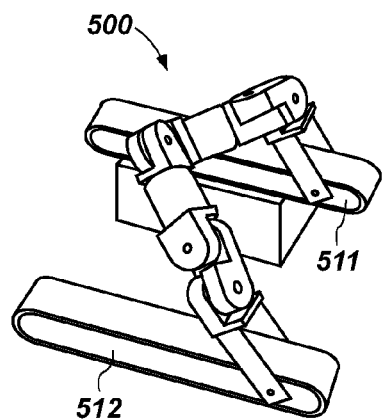
Figure 5E:
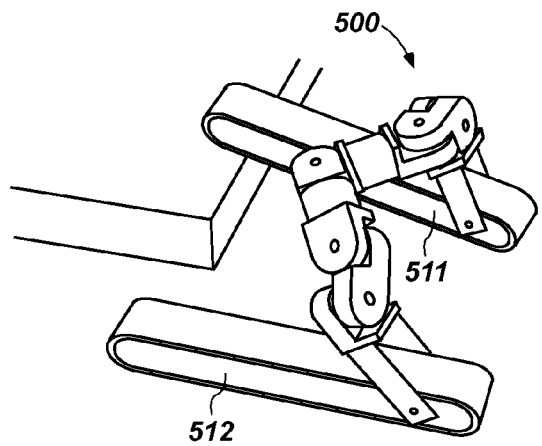
Figure 5F:
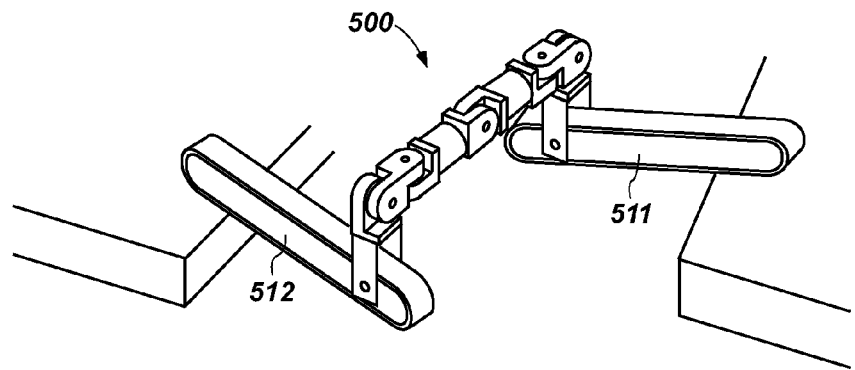
Figure 5G:
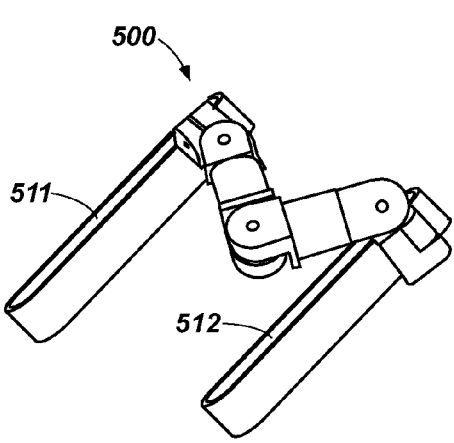
Figure 5H:
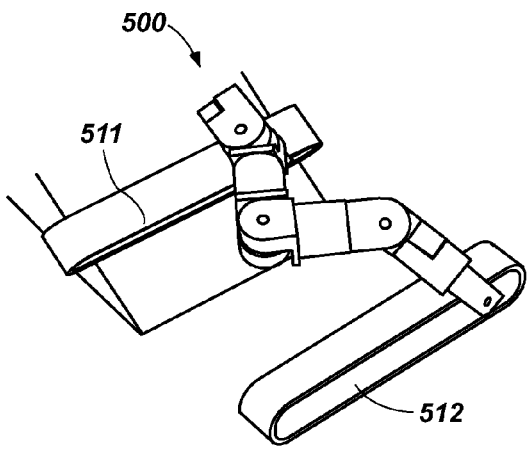
Figure 5I:
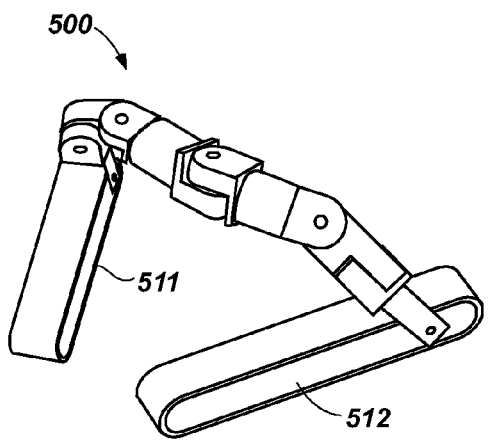
Figure 5J:
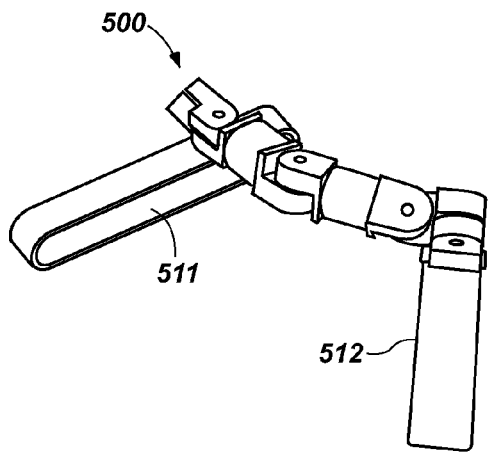
Figure 5K:
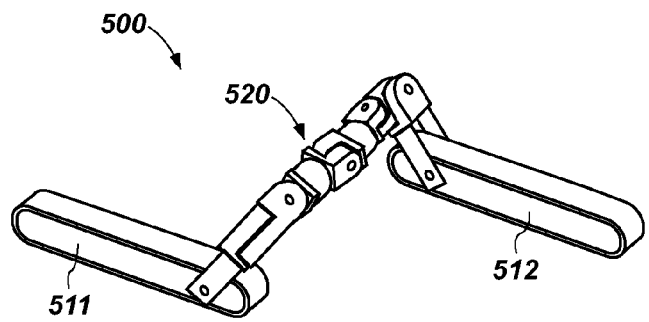
Figure 5L:
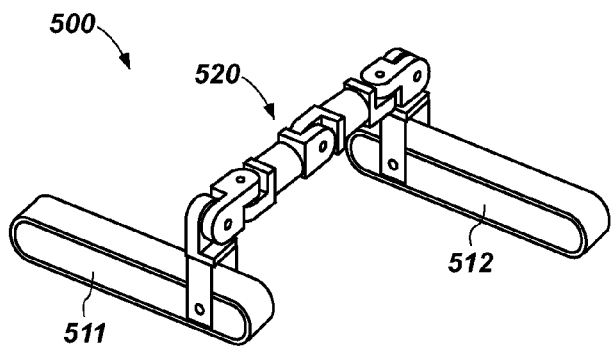
Figure 5M:
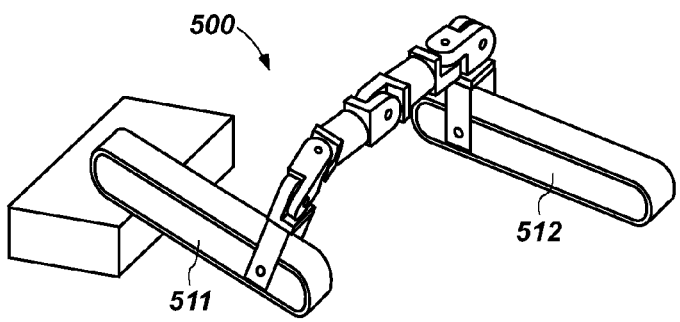
Figure 5N:
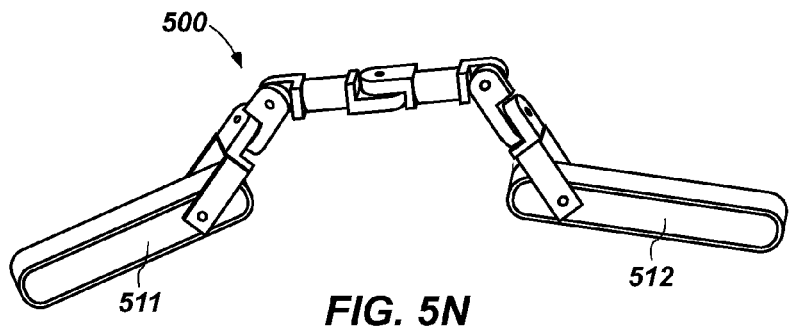
Figure 5O:
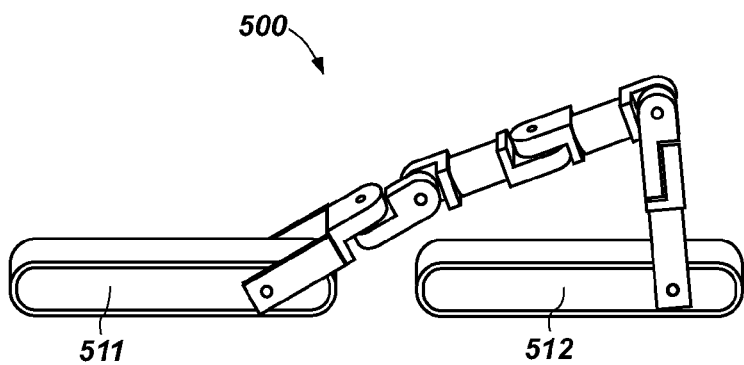
Figure 5P:
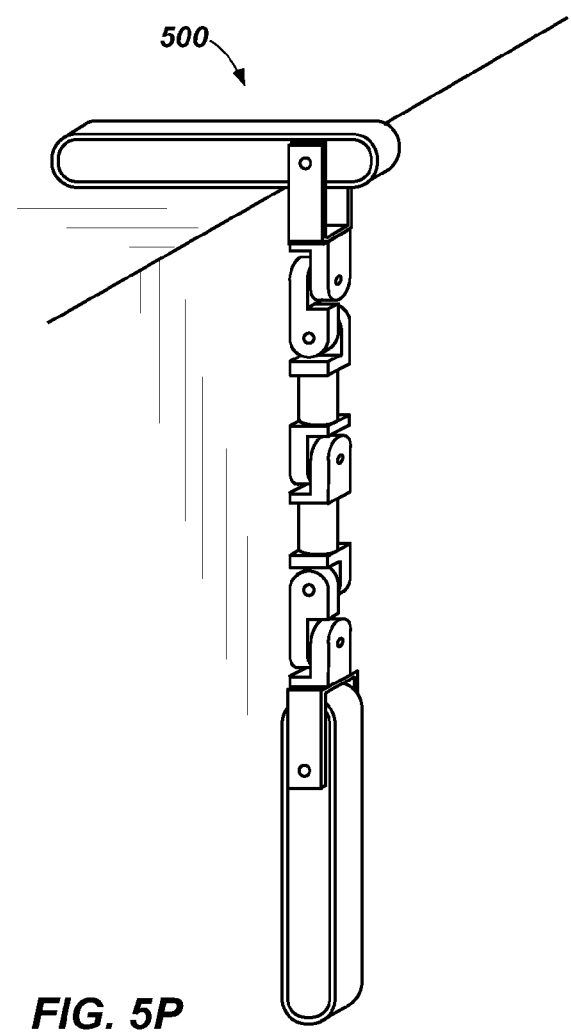

As illustrated in FIGS. 5A-5P, various articulated movements and poses are possible for a serpentine robotic crawler 500 in accordance with embodiments of the present disclosure. In this exemplary embodiment, the robotic crawler 500 comprises moveable first and second linkage members similar to those described above with reference to FIGS. 1A and 1B, and 2A and 2B. In a tank configuration, for example, FIG. 5A illustrates positioning a linkage arm 520 over the first and second frames 511, 512. Such positioning of the linkage arm 520 can be useful to shift or adjust the center of gravity of the serpentine robotic crawler 500, which can aid in traversing a sloped terrain or obstacle. FIGS. 5B-5D illustrate how the first and second frames 511, 512 of the serpentine robotic crawler 500 can be used as feet to walk forward/backward (FIGS. 5B and 5C) or to sidestep (FIG. 5D) onto an obstacle, for example. FIGS. 5E and 5F illustrate how the first and second frames 511, 512 of the serpentine robotic crawler 500 can be independently raised in any direction to assist in overcoming obstacles. This can be done in the tank configuration (FIG. 5E) or in the train configuration (FIG. 5F). FIGS. 5G and 5H illustrate how the first and second frames 511, 512 of the serpentine robotic crawler 500 can be angled laterally, together or independently, to control the center of gravity of the serpentine robotic crawler 500 and/or to maintain traction on a surface. For example, FIG. 5G illustrates angling the first and second frames 511, 512 laterally to position the first and second frames 511, 512 on edge. This can increase pressure on a surface to enhance traction. FIG. 5H illustrates the first frame 511 on a surface that is at an angle relative to a support surface of the second frame 512. Traction and balance can therefore be maintained on uneven surfaces. FIGS. 5I and 5J illustrate how the first and second frames 511, 512 of the serpentine robotic crawler 500 can be "toed in" or "toed out," depending on the direction of travel, which can minimize track signature in soft terrain.

Additionally, in a train configuration, for example, FIG. 5K illustrates a "zag" configuration, where the first and second frames 511, 512 of the serpentine robotic crawler 500 are oriented in parallel, but are offset and extending in opposite directions from the linkage arm 520. Similar to the tank configuration, the zag configuration can provide additional lateral stability to the serpentine robotic crawler 500. FIG. 5L illustrates a zag configuration, where the linkage arm 520 of the serpentine robotic crawler 500 has been raised to provide increased obstacle clearance and reduce the likelihood of high-centering. FIG. 5M illustrates how ends of the first and second frames 511, 512 of the serpentine robotic crawler 500 can be independently raised or lowered when in a zag configuration to assist in overcoming obstacles. FIG. 5N illustrates a train configuration where the first and second frames 511, 512 of the serpentine robotic crawler 500 are extending in substantially opposite directions, but are not parallel. This pose can be evident when turning the serpentine robotic crawler 500 in a train configuration. FIG. 5O illustrates a train configuration where the first and second frames 511, 512 of the serpentine robotic crawler 500 are extending in substantially the same direction and are substantially parallel. This pose can reduce the overall length of the serpentine robotic crawler 500 in a train configuration. FIG. 5P illustrates the serpentine robotic crawler 500 climbing a wall in a train configuration.

It should be understood that the various poses of the serpentine robotic crawler 500 described above can be viewed in a static sense or in a dynamic sense, where the serpentine robotic crawler 500 dynamically varies its pose as it is operated. Moreover, modified versions of the above poses may also prove useful, depending on the environment in which the serpentine robotic crawler 500 operates. It should also be appreciated that operation of the linkage arm 520 can also assist in propulsion. For example, sudden jerky movements of the linkage arm 520 can help to provide traction or to free the serpentine robotic crawler 500 when entangled. As another example, the spatial orientation of the tracks can be periodically or continuously adjusted by the linkage arm 520 to conform to a surface being traveled over.

Figure 6:
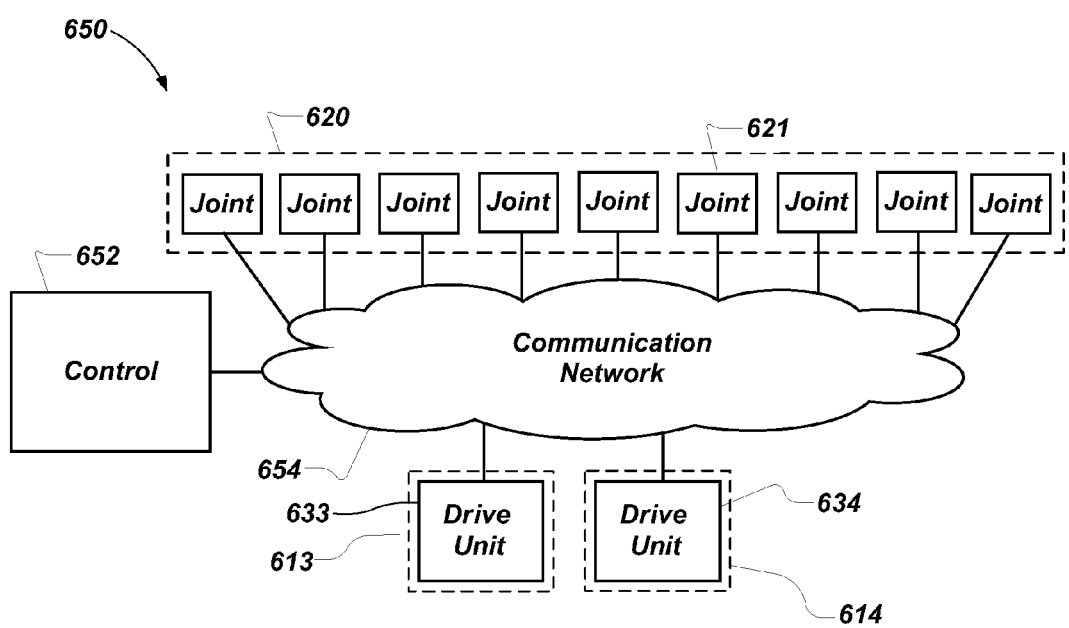
FIG. 6 is a schematic diagram of a control system in accordance with an example of the present disclosure.

Control of a serpentine robotic crawler will now be discussed in further detail. As noted above, movement and pose of the serpentine robotic crawler can be controlled through articulation of a multiple degree of freedom linkage arm and rotation of continuous tracks. Accordingly, as shown in schematic form in FIG. 6, a control system 650 of a serpentine robotic crawler can include a control subsystem 652. The control subsystem 652 can be in communication with each of the actuated joints 621 of linkage arm 620 to control the pose of the serpentine robotic crawler. The control subsystem 652 can also be in communication with the drive units 633, 634, which are coupled to the first and second continuous tracks 613, 614, to control the speed and direction of continuous track rotation to control movement of the serpentine robotic crawler. A communication network 654 can be configured to exchange communication between the control subsystem 652, the joints 621 in the linkage arm 620, and the drive units 633, 634. Thus, the control subsystem 652 can be in communication with each drive unit 633, 634 and with each actuated joint 621 in the linkage arm 620 and can be configured to selectively actuate each drive 633, 634 and actuated joint 621 to control the pose of the serpentine robotic crawler.

Various implementations of the communications network are possible. For example, various communications protocols are known which allow a large number of nodes to communicate on a limited number of wires, including for example RS-485, RHAMIS, USB, Ethernet, and the like. Alternately, the communications network can include wireless components. For example, the communication network can include a wireless portion providing communication between the serpentine robotic crawler and a control system located remotely from the serpentine robotic crawler.

Various implementations of the control subsystem are possible. For example, in one embodiment, the control system can use a replica master for control of the serpentine robotic crawler. In a replica master control system, a replica master is located remotely from the serpentine robotic crawler. The replica master contains the same joints as the serpentine robotic crawler, and is manually manipulated into the desired poses. Sensors located at the joints sense the position of the joints, and these positions are communicated to the serpentine robotic crawler which actuates its joints to attempt to establish the same pose. Optionally, the joints in the serpentine robotic crawler can include force sensors, torque sensors, or both, allowing the force and/or torque on the joints to be measured. The joint forces and/or torques can optionally be communicated back to the replica master, providing force feedback into the control system. Various force feedback control systems are known which can be applied to embodiments of the present invention.

The control system may be integrated into the serpentine robotic crawler thereby allowing the crawler to operate autonomously. For example, the crawler may operate autonomously for an extended period of time. In an embodiment, the control system can include distributed joint and track controllers which locally control one or more closely associated joints. Distributed joint and track controllers can communicate with a master controller located within the crawler or located externally from the crawler.

In another embodiment, control of the serpentine robotic crawler can include control of a first frame, with other frames slaved to the first frame. For example, an operator can control the orientation and movement of the first frame. The other frames then follow the first frame. One particular control scheme can include automatically steering the other frames in following the first frame so as to minimize forces imposed on the linkage arm.

As another example, control of the serpentine robotic crawler can include use of a joystick. For example, a two-dimensional joystick can be used to control a pose of the robot, for example by controlling motion of the actuated linkage via the joystick. Movement of the two-degrees of motion in the joystick can be translated into complex movements of the multi-degree of freedom actuated linkage via predefined primitives. As a particular example, movement of the joystick to the left or right can arch the serpentine robotic crawler to the left or right, with sustained holding of the joystick moving the serpentine robotic crawler between a tank-like configuration and a train-like configuration. As another particular example, movement of the joystick to the front or back can arch the serpentine robotic crawler up or down, with sustained holding of the joystick forward or backward placing the serpentine robotic crawler into an inside- or outside-climbing configuration. Of course, a variety of mappings from a joystick to movements can be defined, as will be appreciated. Interface between an operator and the control system can be provided via a menu driven interface operational on a personal computer, laptop, personal data assistant, and the like, as is known.

The control system can also be configured to provide a degree of compliance in the joints. For example, forces applied to the joints by the environment of the flexible robotic crawler can be sensed and communicated to the control system. When certain force thresholds are exceeded, the joints can be allowed to move. For example, joints can include breakaway clutches, implemented either via mechanical systems, electronic systems, or hybrid electro-mechanical systems. Force limit thresholds can be made adjustable to provide variable compliance to the serpentine robotic crawler. For example, high thresholds to provide a stiff posture may prove useful in pushing through certain types of obstructions. Alternately, low thresholds may prove useful in bending around other types of obstructions.

As another example, the control system can be implemented using a processing system. Various movement primitives can be preprogrammed, including for example primitives to assume certain poses (e.g., tank, train, or climbing configurations), and primitives for movement (e.g., forward, backwards). Control can include feedback from joint force sensors and environmental sensors. Hybrid human and automated control can be combined. For example, high-level manual commands/primitives can be implemented using automated low-level feedback loops that execute the commands/primitives. Control function can be divided into subsystems, including for example, pose control, compliance control, movement control, force control, and hybrid combinations thereof.

In an alternate configuration of a serpentine robotic crawler, the serpentine robotic crawler can include a more than two frame units, each having a continuous track rotatably supported therein. At least one multi-degree of freedom linkage arm can be coupled between the frame units. For example, with N frame units, N−1 linkage arms are used to intercouple the frames into a multi-frame train. The multi-degree of freedom linkage arms can include at least nine joint axes, as described above, for example. Optionally, the multi-degree of freedom linkage arm can be removably connected between the frame units, to allow the multi-frame train to be reconfigured, for example into a number of individual frames, pairs of frames, or shorter multi-frame trains.

A serpentine robotic crawler can also include various sensors or tools positioned on the actuated multi-degree of freedom linkage arm and or the frame. For example, a serpentine robotic crawler can have a camera disposed on one of the frames. As another example, cameras can be disposed on both the leading and the trailing frame. For example, a front camera can be used primarily for scanning the environment, and a rear camera can be used for observing the pose of the serpentine robotic crawler for control purposes. Other sensors, including for example, radar, lidar, infrared detectors, temperature sensors, chemical sensors, force sensors, motion detectors, microphones, antennas, and the like can be disposed on the serpentine robotic crawler. As another example, tools, including for example, light sources, clamps, grippers, manipulators, cutters, drills, material samplers, and the like can also be disposed on the serpentine robotic crawler. As another example, the serpentine robotic crawler can include articulated arms disposed on the frame. Examples of such articulated arms can be found in commonly owned and co-pending U.S. patent application Ser. No. 11/985,336, entitled "Tracked Robotic Vehicle with Articulated Arms," filed Nov. 13, 2007, which describes a serpentine robotic crawler having articulated arms, and which is herein incorporated by reference in its entirety.

Applications for a serpentine robotic crawler can include search and rescue, military operations, and industrial operations. The serpentine robotic crawler can help to avoid the need to expose humans to hazardous environments, such as unstable buildings, military conflict situations, and chemically, biologically, or nuclear contaminated environments. The configurational flexibility of the serpentine robotic crawler provides multiple movement modes. For example, movement in a tank-like configuration can provide high stability. Movement in a train-like configuration can provide access through narrow passages or pipes. Climbing the outside of structures, e.g., a pole, and climbing the inside of structures, e.g., inside a pipe, are also possible.

In accordance with one embodiment of the present invention, a method for facilitating operation of a serpentine robotic crawler is disclosed. The method can comprise providing a serpentine robotic crawler. The serpentine robotic crawler can include a first frame having a first continuous track rotatably supported by the first frame, a second frame having a second continuous track rotatably supported by the second frame, and a linkage arm coupling the first and second frames together in tandem. The linkage arm can have a first elbow-like joint formed by an interface between the first frame and a first linkage member, and a second elbow-like joint formed by an interface between the second frame and a second linkage member. The linkage arm can also have a first wrist-like actuated linkage coupled to the first linkage member. The first wrist-like actuated linkage can include actuated joints that provide rotational movement about a longitudinal axis and bending movement about two different lateral axes. The linkage arm can also include a second wrist-like actuated linkage coupled to the second linkage member. The second wrist-like actuated linkage can include actuated joints that provide rotational movement about a longitudinal axis and bending movement about two different lateral axes. The linkage arm can further include a third elbow-like joint formed by a coupling of the first wrist-like actuated linkage and the second wrist-like actuated linkage. The third elbow-like actuated joint can provide bending movement about a lateral axis. The method can further comprise facilitating positioning of the first wrist-like actuated linkage out of plane from the first frame with the first elbow-like actuated joint, via the first linkage member. Additionally, the method can comprise facilitating positioning of the second wrist-like actuated linkage out of plane from the second frame with the second elbow-like joint, via the second linkage member. The positioning of the first and second wrist-like linkages relative to the frame can include embodiments that comprise locating the first and second wrist-like linkages in a fixed position or configuration, or locating these in one of a plurality of available moveable positions or configurations.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A serpentine robotic crawler, comprising:
    a first frame having a first continuous track rotatably supported by the first frame;
    a second frame having a second continuous track rotatably supported by the second frame; and
    a linkage arm coupling the first and second frames together in tandem, the linkage arm having
        a first elbow-like joint formed by an interface between the first frame and a first linkage member,
        a second elbow-like joint formed by an interface between the second frame and a second linkage member,
        a first wrist-like actuated linkage coupled to the first linkage member, wherein the first wrist-like actuated linkage includes actuated joints that provide rotational movement about a longitudinal axis and bending movement about two different lateral axes,
        a second wrist-like actuated linkage coupled to the second linkage member, wherein the second wrist-like actuated linkage includes actuated joints that provide rotational movement about a longitudinal axis and bending movement about two different lateral axes, and
        an actuated third elbow-like joint formed by a coupling of the first wrist-like actuated linkage and the second wrist-like actuated linkage, wherein the third elbow-like joint provides bending movement about a lateral axis,
    wherein the first linkage member, via first elbow-like joint, is positionable to allow the first wrist-like actuated linkage to be out of plane from the first frame, and
    wherein the second linkage member, via the second elbow-like joint, is positionable to allow the second wrist-like actuated linkage to be out of plane from the second frame.

2. The serpentine robotic crawler of claim 1, wherein the first linkage member is coupled to the first frame between leading and trailing ends of the first continuous track.

3. The serpentine robotic crawler of claim 2, wherein movement of at least one of the first elbow-like joint and the second elbow-like joint is actuated by a dedicated drive.

4. The serpentine robotic crawler of claim 1, wherein movement of at least one of the first elbow-like joint and the second elbow-like joint is actuated.

5. The serpentine robotic crawler of claim 1, wherein movement of at least one of the first elbow-like joint and the second elbow-like joint is passive.

6. The serpentine robotic crawler of claim 5, wherein the at least one of the first elbow-like joint and the second elbow-like joint is movable to a selectively fixed position.

7. The serpentine robotic crawler of claim 1, wherein the two different lateral axes of at least one of the first wrist-like actuated linkage and the second wrist-like actuated linkage are at a substantially right angle to one another.

8. The serpentine robotic crawler of claim 1, wherein each of the first and second frames further comprises a drive coupled to the continuous track.

9. The serpentine robotic crawler of claim 8, further comprising a control subsystem in communication with each drive and with each actuated joint in the linkage arm and configured to selectively actuate each drive and actuated joint to control the pose of the robotic crawler.

10. The serpentine robotic crawler of claim 8, wherein each of the first elbow-like joint and the second elbow-like joint are actuatable by one of the drives to cause movement.

11. The serpentine robotic crawler of claim 1, wherein an axis of rotation for the first elbow-like joint is coaxial with a drive wheel for the first continuous track.

12. The serpentine robotic crawler of claim 1, wherein a range of motion of the first linkage member about the first elbow-like joint is physically limited to prevent contact between at least a portion of the linkage arm and the first continuous track.

13. A serpentine robotic crawler, comprising:
    a first frame having a first continuous track rotatably supported by the first frame;
    a second frame having a second continuous track rotatably supported by the second frame; and
    a linkage arm coupling the first and second frames together in tandem and being movable about a first lateral axis associated with the first frame, a second lateral axis associated with the second frame, and at least two longitudinal axes, which longitudinal axes are oriented by movement of the linkage arm about at least one of the first lateral axis and the second lateral axis,
    wherein movement about the first lateral axis and the second lateral axis facilitates exposure of leading and trailing ends of each continuous track.

14. The serpentine robotic crawler of claim 13, wherein the first lateral axis is between the leading and trailing ends of the first continuous track.

15. The serpentine robotic crawler of claim 13, wherein movement about the first lateral axis and the second lateral axis is actuated.

16. The serpentine robotic crawler of claim 13, wherein movement about the first lateral axis and the second lateral axis is passive.

17. The serpentine robotic crawler of claim 13, wherein the first lateral axis is coaxial with a drive wheel for the first continuous track.

18. The serpentine robotic crawler of claim 13, wherein a range of motion of the first linkage member about the first lateral axis is physically limited to prevent contact between at least a portion of the linkage arm and the first continuous track.

19. A serpentine robotic crawler, comprising:
    a first frame having a first continuous track rotatably supported by the first frame;
    a second frame having a second continuous track rotatably supported by the second frame; and
    a linkage arm coupling the first and second frames together in tandem, the linkage arm having
        a first wrist-like actuated linkage coupled to the first frame, wherein the first wrist-like actuated linkage includes actuated joints that provide rotational movement about a longitudinal axis and bending movement about two different lateral axes,
        a second wrist-like actuated linkage coupled to the second frame, wherein the second wrist-like actuated linkage includes actuated joints that provide rotational movement about a longitudinal axis and bending movement about two different lateral axes, and an elbow-like actuated joint formed by a coupling of the first wrist-like actuated linkage and the second wrist-like actuated linkage, wherein the elbow-like actuated joint provides bending movement about a lateral axis, wherein the first wrist-like actuated linkage is positioned out of plane from the first frame, and wherein the second wrist-like actuated linkage is positioned out of plane from the second frame.

20. A method for facilitating operation of a serpentine robotic crawler, comprising:

providing a serpentine robotic crawler, comprising a first frame having a first continuous track rotatably supported by the first frame, a second frame having a second continuous track rotatably supported by the second frame, and a linkage arm coupling the first and second frames together in tandem, the linkage arm having a first elbow-like joint formed by an interface between the first frame and a first linkage member, a second elbow-like joint formed by an interface between the second frame and a second linkage member, a first wrist-like actuated linkage coupled to the first linkage member, wherein the first wrist-like actuated linkage includes actuated joints that provide rotational movement about a longitudinal axis and bending movement about two different lateral axes, a second wrist-like actuated linkage coupled to the second linkage member, wherein the second wrist-like actuated linkage includes actuated joints that provide rotational movement about a longitudinal axis and bending movement about two different lateral axes, and a third elbow-like joint formed by a coupling of the first wrist-like actuated linkage and the second wrist-like actuated linkage, wherein the elbow-like actuated joint provides bending movement about a lateral axis;

facilitating positioning of the first wrist-like actuated linkage out of plane from the first frame with the first elbow-like actuated joint, via the first linkage member; and facilitating positioning of the second wrist-like actuated linkage out of plane from the second frame with the second elbow-like joint, via the second linkage member.

* * * * *